(12) United States Patent
Gutjahr et al.

(10) Patent No.: US 9,312,736 B2
(45) Date of Patent: Apr. 12, 2016

(54) ELECTRIC MACHINE, IN PARTICULAR OF A PUMP UNIT

(71) Applicant: BAUMUELLER NUERNBERG GMBH, Nuremberg (DE)

(72) Inventors: Frank Gutjahr, Etzelwang (DE); Peter Lemke, Schwabach (DE)

(73) Assignee: Baumueller Nuernberg GmbH, Nuremberg (DE)

(*) Notice: Subject to any disclaimer, the term of this patent is extended or adjusted under 35 U.S.C. 154(b) by 473 days.

(21) Appl. No.: 13/919,611

(22) Filed: Jun. 17, 2013

(65) Prior Publication Data

US 2013/0280110 A1    Oct. 24, 2013

Related U.S. Application Data

(63) Continuation of application No. PCT/EP2011/002459, filed on May 18, 2011.

(30) Foreign Application Priority Data

Dec. 16, 2010 (DE) .......................... 10 2010 054 800
Jan. 29, 2011 (DE) .......................... 10 2011 009 714

(51) Int. Cl.
    *H02K 5/173*    (2006.01)
    *F16C 27/04*    (2006.01)
    *F16C 35/077*   (2006.01)
    *H02K 7/14*     (2006.01)
    (Continued)

(52) U.S. Cl.
    CPC .............. *H02K 5/1735* (2013.01); *F16C 19/04* (2013.01); *F16C 27/04* (2013.01); *F16C 35/077* (2013.01); *H02K 5/1732* (2013.01); *H02K 7/14* (2013.01); *H02K 7/003* (2013.01)

(58) Field of Classification Search
    CPC ........... H02K 5/00–5/26; H02K 5/173–1/1737
    USPC ......................................................... 310/90
    See application file for complete search history.

(56) References Cited

U.S. PATENT DOCUMENTS 4,255,098 A * 3/1981 Hertell .................... B60T 17/02
                                                          417/372
5,235,227 A    8/1993 Fazekas
5,577,847 A   11/1996 Nakamura et al.
(Continued)

FOREIGN PATENT DOCUMENTS

CN      1853047 A      10/2006
CN    101809292 A       8/2010
(Continued)

OTHER PUBLICATIONS

International Search Report of PCT/EP2011/002459, Dated Sep. 28, 2011.

*Primary Examiner* — Thomas Truong
(74) *Attorney, Agent, or Firm* — Laurence A. Greenberg; Werner H. Stemer; Ralph E. Locher

(57) ABSTRACT

An electric machine has in a machine housing, a stator and a rotor which is arranged on a motor shaft which is supported on a non-drive side in a bearing unit which has a ball bearing arrangement and is arranged within the machine housing in a radially elastic and axially displaceable manner. The electric machine is preferably coupled on the drive side without a bearing via a rigid shaft coupling to a work machine, in particular to a hydraulic pump.

14 Claims, 3 Drawing Sheets

(51) Int. Cl.
*F16C 19/04* (2006.01)
*H02K 7/00* (2006.01)

(56) References Cited

U.S. PATENT DOCUMENTS

| | | | | |
|---|---|---|---|---|
| 5,898,249 | A * | 4/1999 | Boggs, III | F16D 27/09 |
| | | | | 192/84.1 |
| 7,131,275 | B2 * | 11/2006 | Gustafson | F02C 7/275 |
| | | | | 310/100 |
| 2003/0180162 | A1 | 9/2003 | Beyer et al. | |
| 2007/0230839 | A1 | 10/2007 | Childe et al. | |
| 2011/0081231 | A1 | 4/2011 | Hoelzer et al. | |

FOREIGN PATENT DOCUMENTS

| | | |
|---|---|---|
| DE | 2309351 A1 | 9/1974 |
| DE | 19818634 A1 | 11/1999 |
| JP | H0880007 A | 3/1996 |
| JP | 2003172288 A | 6/2003 |
| JP | 2005321006 A | 11/2005 |
| JP | 2007211865 A | 8/2007 |
| RU | 2015426 C1 | 6/1994 |
| SU | 1413315 A1 | 7/1988 |
| WO | 2009075671 A1 | 6/2009 |

\* cited by examiner

_US 9,312,736 B2_

ELECTRIC MACHINE, IN PARTICULAR OF A PUMP UNIT

CROSS-REFERENCE TO RELATED APPLICATION

This application is a continuation, under 35 U.S.C. §120, of copending international application No. PCT/EP2011/002459, filed May 18, 2011, which designated the United States; this application also claims the priority, under 35 U.S.C. §119, of German patent application No. DE 10 2010 054 800.6, filed Dec. 16, 2010 and German patent application No. DE 10 2011 009 714.7, filed Jan. 29, 2011; the prior applications are herewith incorporated by reference in their entireties.

BACKGROUND OF THE INVENTION

Field of the Invention

The invention relates to an electric machine. An electric machine of this type is known, for example, from published, non-prosecuted German patent application DE 23 09 351 A1. Here, an electric machine is understood to mean, in particular, an electric motor which can be coupled as a power machine of a pump unit to a work machine, for example of a hydraulic pump (servopump).

An electric machine of this type usually has two bearings which support the shaft ends of the motor shaft in a rotationally movable manner, which motor shaft carries the rotor (armature), which bearings are received by end shields which cover the machine housing on the end side. Here, the output-side bearing which is called the drive-side bearing (drive-side end shield) is as a rule a locating bearing, whereas the rotor or armature bearing which lies opposite is frequently configured as a sliding seat, in order for it to be possible to compensate for thermal expansions of the rotor (armature). The arrangement of the locating bearing and the sliding seat can also be the other way round.

In combination with a work machine, for example a pump for delivering hydraulic liquid, the electric machine which is then also called a power machine is frequently mechanically connected to the work machine (pump) via a rotating shaft. The coupling of the motor shaft of the power machine to the shaft (pump shaft) of the work machine can take place via a gear mechanism or via a coupling. Shaft couplings of this type ensure the necessary compensation of production and/or assembly tolerances during the operation of a unit of this type, and ensure the compensation of different thermal length expansions of the rotor and the stator of the electric machine, in order to absorb corresponding displacement differences.

However, the use in servo-operated hydraulic pumps (hydraulic unit) of a coupling of this type which frequently contains elements which are susceptible to wear requires additional installation space and in addition reduces the torsional rigidity of the shaft connection. In the case of a hydraulic pump which is servo-operated by way of, for example, converter-controlled pressure regulation, especially in highly dynamic applications which require broad torque regulation, this leads to a significant deterioration in the operating range of the regulating circuit which is used.

SUMMARY OF THE INVENTION

The invention is based on the object of specifying an electric machine which is improved, in particular, with regard to the shaft mounting and can be coupled in a simple and reliable way to a work machine, in particular a hydraulic pump.

To this end, the electric machine has a bearing unit which is arranged radially elastically and axially displaceably within the non-drive end shield or a bearing hub there and has a ball bearing arrangement. To this end, the ball bearing arrangement within the bearing hub is surrounded suitably by a sleeve or bush which for its part lies radially on an elastomeric element, in particular an O-ring, such that it can be displaced axially slightly.

The ball bearing arrangement advantageously has two deep-groove ball bearings, which ball bearing arrangement is received by an also standard bearing hub of the electric machine (electric motor) in a radially elastic and axially displaceable manner as a consequence of the elastomeric element. In order to prevent sliding of the rolling bodies of the ball bearings, the bearing unit of simple and inexpensive construction is configured as a module which is prestressed in itself.

Here, the invention proceeds from the consideration that a compact construction of an electric motor as a power machine and of a drive machine, for example in the form of a hydraulic pump, can be achieved if the electric motor is mounted on the work machine to be driven without a dedicated drive-side bearing by a rigid shaft connection, that is to say a rigid shaft coupling or a continuous shaft, which work machine for its part has a self-mounting device which fixes the machine shaft axially and radially. In order to make this possible, an over-defined nature of the motor mounting is to be avoided as has been discovered. This can be achieved by virtue of the fact that the non-drive side mounting of the motor shaft which has no bearing on the drive side is of radially elastic and axially at least slightly displaceable configuration.

In order to avoid the jamming and for damping purposes, in a way which is known per se from published, non-prosecuted German patent application DE 198 18 634 A1, a radial and slightly axial displaceability of a floating bearing can be realized by a sleeve which first receives a ball bearing arrangement and second is supported radially on the outside via an elastic element. The sleeve with the inserted ball bearings is pushed into an also standard non-drive side bearing hub and rests there in the assembled state on the elastic element which is provided on the outer circumference of the sleeve.

The prestress within the bearing unit is affected suitably by a compensation washer in the form preferably of an ondular washer, by way of which the deep-groove ball bearings are braced axially against one another. As a result, the required minimum loading of the ball bearings is ensured even without external loading on the motor shaft, and sliding of the rolling bodies of the ball bearings is avoided, with the result that a failure of these antifriction bearings is prevented reliably.

The bearing unit suitably has an adjusting washer as a spacer element between the inner rings of the two deep-groove ball bearings. In addition, an outer securing ring is expediently provided which holds the bearing outer ring of that ball bearing of the bearing unit which is adjacent to the outer securing ring in the axial position. The outer securing ring is expediently inserted with its outer edge into an annular groove which is made on the inner wall side of the bearing sleeve or bush.

An additionally provided inner securing ring which is preferably in turn arranged on that bearing side, on which the ondular washer and the outer securing ring are also provided, ensures axial fixing of the adjacent bearing inner ring of the ball bearing arrangement. The inner securing ring lies with its outer edge in an annular groove which is made on the circumferential side of the bearing-side shaft shank of the motor shaft.

In order to assemble a drive unit with the electric machine as a power machine and with a work machine, first of all the rotor of the power machine with a shrink disk which is placed onto its motor shaft is placed onto the facing shaft end of the machine shaft of the work machine and is guided to an assembly stop, the shrink disk subsequently being clamped and the shaft end of the motor shaft being connected fixedly to the shaft end of the machine shaft so as to rotate with it, and the machine housing which contains the stator afterward being pushed onto the rotor and being fastened to a flange of the work machine. The stop is advantageously produced by a spacing or bearing template which is positioned or attached removably to the flange of the work machine.

The advantages which are achieved with the invention consist, in particular, in the fact that a mounting or bearing unit which compensates for static radial and statically or thermally induced axial tolerances is provided in the form of a module which is braced within itself and can be introduced instead of a conventional ball bearing into the bearing hub of a standard end shield which is already present. As a result, first no special end shield is required, which makes a machine or motor mounting with low expenditure possible. Second, the bearing unit which is developed according to the invention contains only a simple rotationally symmetrical bearing sleeve and otherwise merely inexpensive standardized or standard components. In addition, the assembly of the bearing unit into the bearing hub is restricted to simply pushing in the bearing module.

Furthermore, an anti-rotation safeguard of the bearing unit in or with respect to the bearing hub is produced solely by the frictional connection by the elastomeric element (O-ring), with the result that the elastomeric element (O-ring) performs a double function, namely first the radial elasticity of the bearing unit and second its anti-rotation safeguard. As a result, no additional positively locking connection of the sleeve with the bearing hub is required, in order to prevent corotation of the sleeve or the bearing unit. In addition, the elastomer or the O-ring acts merely as bearing support and does not serve to absorb forces.

The electric machine and, in particular, the bearing unit according to the invention makes the provision of a comparatively cost-saving unit possible with a rigid shaft attachment or else a continuous shaft between the electric machine (electric motor) which serves as power machine and the drive machine in the form, for example, of a hydraulic pump, the electric motor not having a drive-side bearing. The static tolerance compensation which is required merely in the case of a suitably rigid shaft coupling of this type in the form of a continuous single-piece shaft or a shaft attachment by the shrink disk is not realized in the rotating reference system of the shaft by a dynamic tolerance compensation which is then required in the form of a complicated shaft coupling, on account of the bearing unit which is configured according to the invention. Rather, the radially elastic and axially displaceable non-drive side mounting according to the invention of the power machine likewise statically ensures the tolerance compensation.

The machine according to the invention and, in particular, the bearing unit according to the invention is suitable, in particular, for servopumps and applications of the type in which the direct attachment of an electric motor to a self-mounted drive machine to be driven is of advantage. The electric machine can also be, however, a generator or can be operated as such.

In combination with an integrated rigid shaft coupling which can be actuated by a radial input, and a drive-side transport securing device which can be released suitably following the assembly of the electric motor on account of the modular design of the bearing unit, the electric machine or the electric motor can be constructed in the manner of a kit. This makes the use possible even in the case of a rapidly rotating narrow electric motor. In addition, an attachment of the motor to a machine which has a suitable self-mounting measure of the input shaft can also take place on the premises of the customer.

Other features which are considered as characteristic for the invention are set forth in the appended claims.

Although the invention is illustrated and described herein as embodied in an electric machine, in particular of a pump unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are provided with the same designations in all figures.

Figure 1:
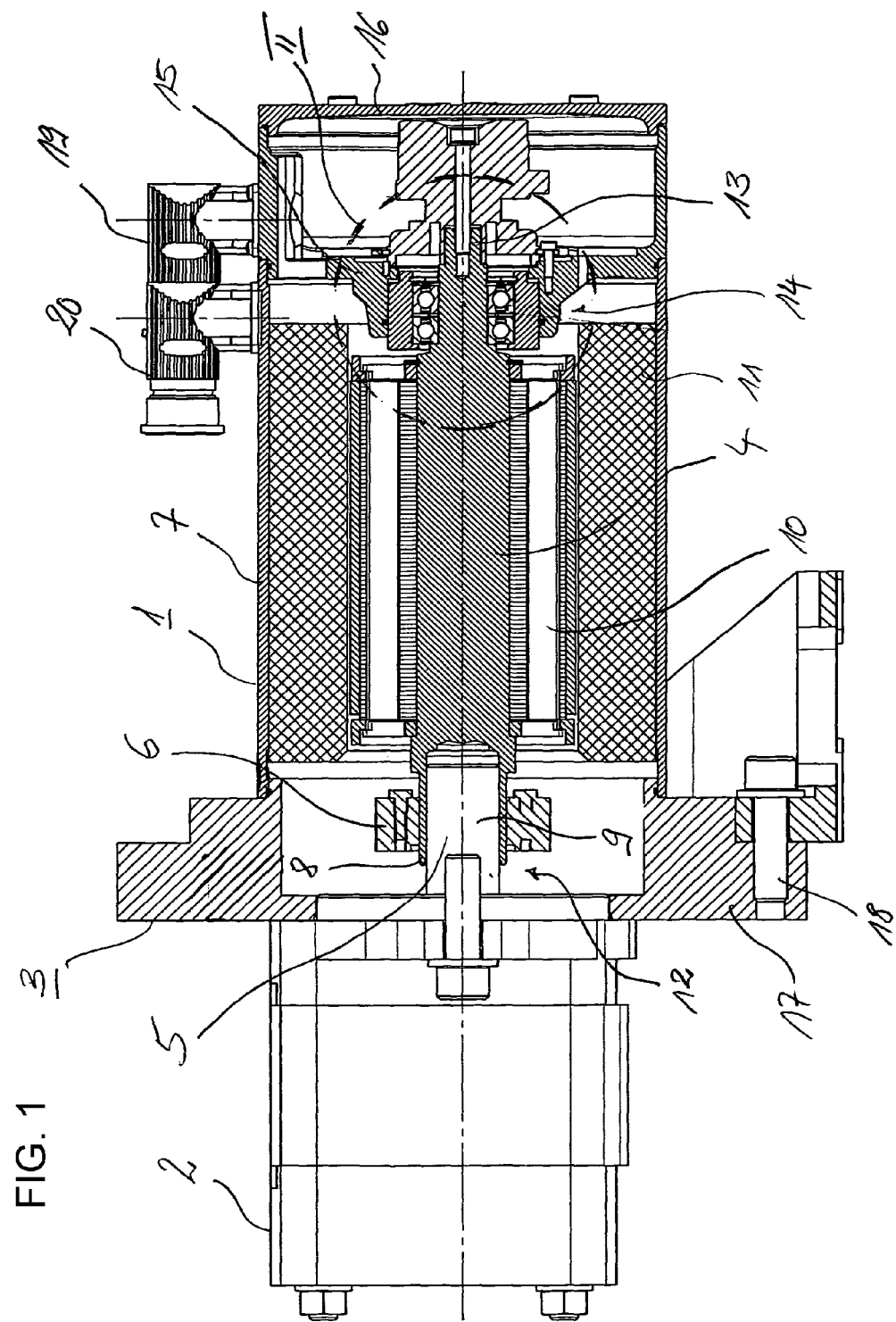
FIG. 1 is a diagrammatic, partial longitudinal sectional view of a pump unit having an electric motor with a motor shaft which has no bearing on a drive side and is roller-mounted on a non-drive side according to the invention.

Referring now to the figures of the drawings in detail and first, particularly to FIG. 1 thereof, there is shown a longitudinal section of an electric motor 1 which is coupled to a pump 2, for example a hydraulic pump, to produce a pump unit 3. Within the pump unit 3, the electric motor 1 forms an electric power machine, whereas the hydraulic pump 2 is the driven machine. A motor shaft 4 of the electric motor 1 and a machine shaft 5 of the pump 2 are connected rigidly to one another by a clamping or shrink disk 6. To this end, that shaft end 8 of the motor shaft 4 which is guided on the drive side out of a machine housing 7 which is called motor housing in the following text engages over that shaft end 9 of the machine shaft 5 of the pump 2 to be coupled which faces it. After screwing of the shrink disk 6 has taken place, the shaft ends 8, 9 are braced to one another in a rotationally secure and play-free manner.

The motor shaft 4, which is guided out of the motor housing 7, of the electric motor 1 which is without a bearing on the output side (drive side) carries a rotor (or armature) 10, opposite which a stator 11 which is fixed to the housing lies with the formation of a gap within the motor housing 7. Within the motor housing 7, the non-drive side shaft end (shaft shank) 13 of the motor shaft 4, which shaft end 13 lies opposite a coupling point 12 which is formed by the rigid connection of the shaft ends 8, 9, is mounted in a bearing unit 14. The bearing unit 14 which is shown on an enlarged scale in FIG. 2 is inserted into a bearing hub 15 of a non-drive side end shield 16.

In the region of the coupling point 12, the motor housing 7 is attached by flange screws 18 to a pump flange 17 of the pump 2. Via the coupling point 12, the electric motor 1 is connected without a dedicated drive-side bearing via the rigid coupling of the shaft ends 8, 9 to the driven pump 2 which itself has a complete self-mounting means in a manner which is not shown in greater detail, with the result that the position of the motor shaft 4 is fixed axially and radially.

Signal and power mounting boxes 19 and 20 which protrude beyond the motor housing 7 serve to connect the pump unit 3 which is driven by the electric motor to, for example, a frequency converter (not shown) for the torque-regulated and/or speed-regulated control of the electric motor 1. Here, in the manner of a servopump, the volumetric flow of the hydraulic oil which is delivered, for example, by the pump 2 is set and regulated via the motor speed of the electric motor 1, whereas the setting of the pressure of the delivered fluid takes place via a torque regulation of the electric motor 1.

Figure 2:
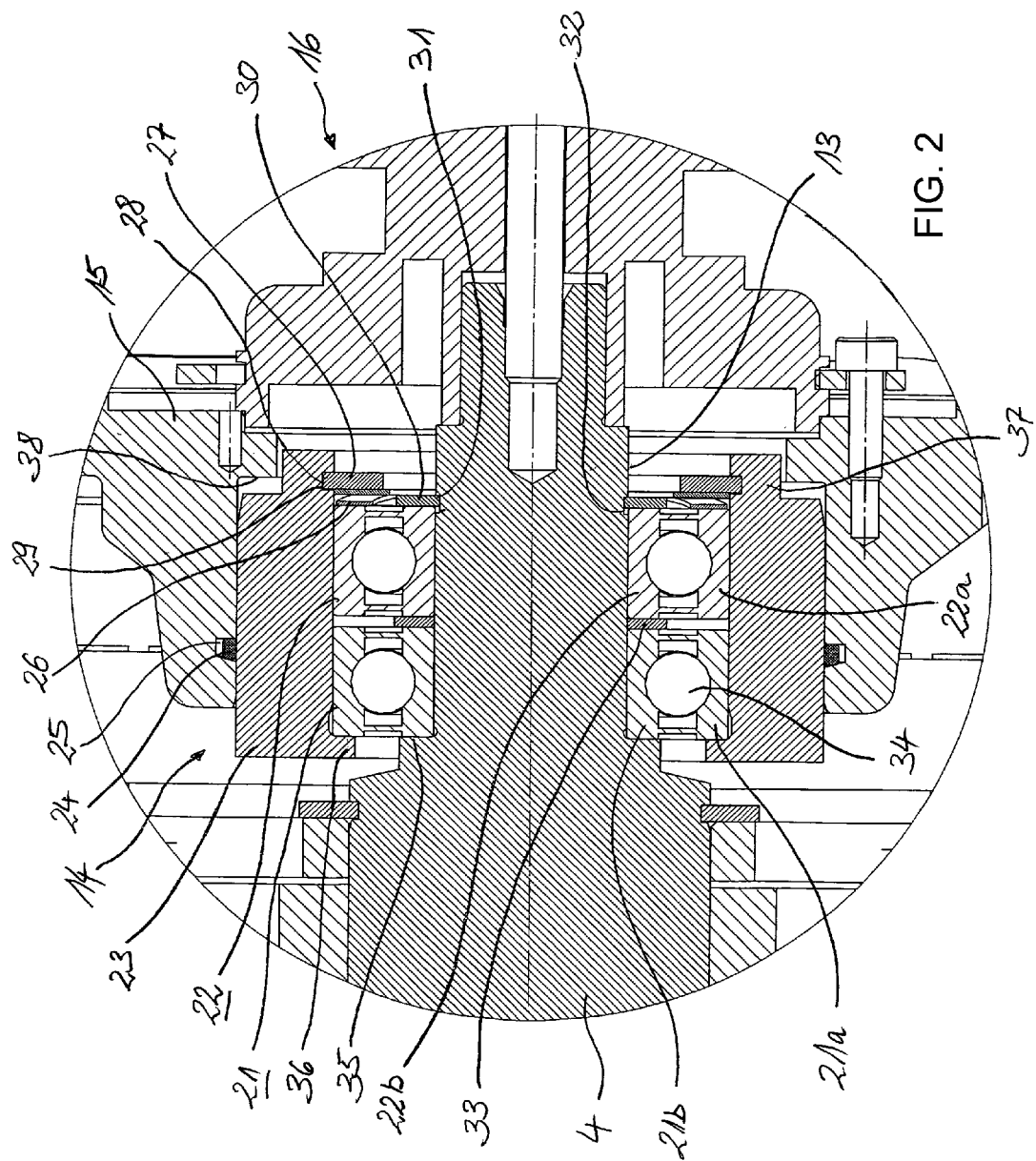
FIG. 2 is a diagrammatic, partial enlarged longitudinal sectional view showing detail II from FIG. 1 of the non-drive side bearing unit with two deep-groove ball bearings within a bearing sleeve.

As can be seen comparatively clearly from FIG. 2, the non-drive side bearing unit 14 of the electric motor 1 contains two deep-groove ball bearings 21, 22 which are arranged next to one another and are arranged within a sleeve (bearing sleeve or bush) 23. Furthermore, the bearing unit 14 contains an elastomeric element in the form of an O-ring 24 which is arranged on the outer circumference of the bearing sleeve 23 so as to enclose the latter and lies in an annular groove 25. In the exemplary embodiment, the annular groove 25 is made in the bearing hub 15 on the inner circumference of the latter. As an alternative, however, the annular groove 25 can also be made in the bearing sleeve 23.

The fitting conditions are selected in such a way that certain radial tolerance compensation is made possible by the O-ring 24. Here, the bearing sleeve 23 is introduced into the bearing hub 15 or into the non-drive end shield 16 in such a way that, even in the axial direction, certain displaceability of the bearing sleeve 23 is ensured in both axial directions. Corotation of the bearing sleeve 23 of the substantially unloaded bearing unit 14 in the bearing hub 15 is prevented as a consequence of the friction between the bearing sleeve 23, the O-ring 24 and the bearing hub 15.

The two deep-groove ball bearings 21, 22 are braced against one another by a compensation washer in the form of an ondular washer 26. The compensation washer 26 acts on the outer ring 22*a* of the outer deep-groove ball bearing 22 which faces the non-drive end shield 16. On that side of the compensation washer 26 which faces away from the outer deep-groove ball bearing 22, an outer securing ring 27 is provided which is seated with its outer edge 28 in an annular groove 29 on the inner circumference of the bearing sleeve 23. The outer securing ring 27 serves for axially fixing the next bearing outer ring 22*a* of the outer deep-groove ball bearing 22.

An inner securing ring 30 which is likewise provided in the region of the compensation washer or the ondular washer 26 serves for axially fixing the adjacent bearing inner ring 22*b* of the outer deep-groove ball bearing 22 and is seated with its outer edge 31 in an annular groove 32 which is made circumferentially in the motor shaft 4 on the shaft end side. An adjusting washer 33 is seated on the shaft end or the shaft shank 13 of the motor shaft 4 between the two bearing inner rings 21*b* and 22*b* of the two deep-groove ball bearings 21 and 22.

The inner rings 21*b*, 22*b* and outer rings 21*a*, 22*a*, which can be moved with respect to one another and are separated by rolling bodies 34, of the two deep-groove ball bearings 21 and 22 are supported on the drive side without a bearing of the electric motor 1 first on a projecting supporting or bearing shoulder 35 of the shaft end or shank 13 of the motor shaft 4 and second on a supporting or bearing collar 36 of the bearing sleeve 23. On the side which lies opposite the supporting collar 36, the bearing sleeve 23 which is configured as a bush is provided on one side with an inner collar 37, by way of which the bearing sleeve 23 is seated in a corresponding shoulder contour 38 of the bearing hub 15.

The embodiment of the bearing unit 14 with the bearing sleeve 23 and the two deep-groove ball bearings 21, 22 which are arranged therein and the O-ring 24 on the outer side of the sleeve is received by the bearing hub 15 in a radially elastic and axially at least slightly displaceable manner. An overdefined nature of the motor mounting of the electric motor 1 which is coupled to the pump 2 via a rigid shaft attachment is avoided by way of the bearing unit 14 which is prestressed by the ondular washer 26 which serves as compensation washer, in order to prevent sliding of the rolling bodies 34. On the non-drive side, the prestressed bearing unit 14 supports the shaft end 13, that is to say the shaft shank of the motor shaft 4 and therefore the rotor 10 of the electric motor 1. The construction and the design of the bearing unit 14 according to the invention makes it possible for it to be received in a standard bearing hub 15 of a standardized non-drive end shield 16.

Figure 3:
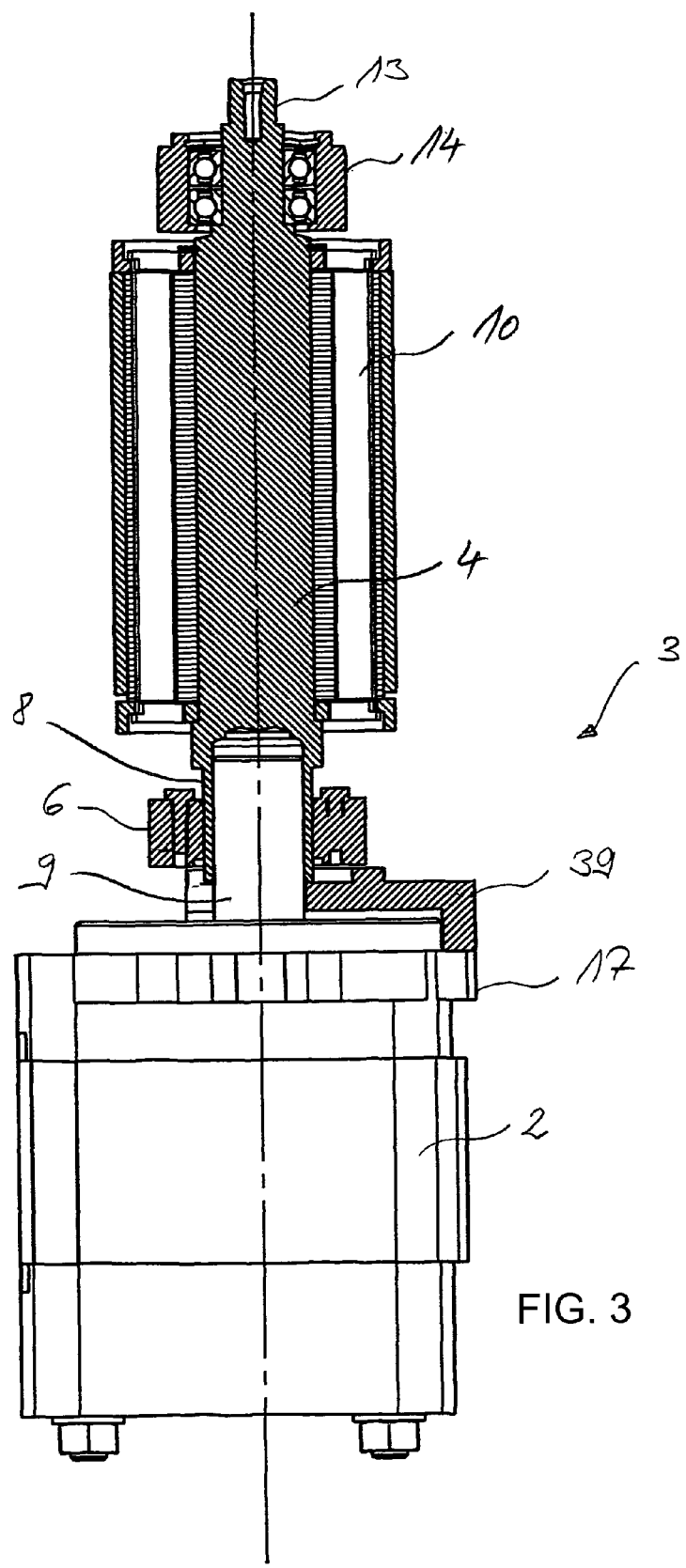
FIG. 3 is a diagrammatic, partial longitudinal sectional showing the pump unit according to FIG. 1 with a stop template and a shaft shrink disk for coupling the motor shaft to a pump shaft.

FIG. 3 shows the pump unit 3 with a rotor 10 of the electric motor 1 placed onto the shaft end 9 of the machine shaft 5 of the pump 2 in a first assembly step. Here, the shaft end 8 of the motor shaft 4 of the electric motor 1 already carries the clamping or shrink disk 6. In this assembly step, a bearing template 39 is attached or placed onto the flange 17 of the pump 2. When the template 39 is attached, the rotor 10 which is seated on the motor shaft 4 with a bearing unit 14 which is mounted thereon on the non-drive side shaft shank 13 is pushed onto the shaft end 9 of the machine shaft 5 of the pump 2 until contact with the template 39. In this state, the motor shaft 4 is positioned axially exactly with respect to the pump flange 17. Subsequently, the shrink disk 39 is braced by screwing and the shaft ends 8 and 9 are therefore coupled rigidly to one another.

In the next assembly step, the template 39 is removed. Subsequently, the motor housing 7 including the stator 11 is pushed over the rotor 10 and is fastened to the pump flange 17 by screwing. Here, the bearing unit 14 is received by the bearing hub 15, in the annular groove 25 of which the O-ring 24 is already inserted.

In summary, in order to assemble the drive unit 3 with the electric machine 1 according to the invention as a power machine and a work machine 2, in particular a hydraulic pump, first of all the rotor 10 of the power machine 1 is placed on the facing shaft end 9 of the machine shaft 5 of the work machine 2 with the shrink disk 6 which is placed onto the motor shaft 4, in particular in a pre-assembly step, and the rotor 10 of the power machine 1 is guided to an assembly stop 39. Subsequently, the shrink disk 6 is braced and in the process the motor shaft 4 is connected fixedly to the shaft end 9 of the machine shaft 5 so as to rotate with it. Thereupon, the machine housing 7 which contains the stator 11 is pushed onto the rotor 10 and is fastened to the flange 17 of the work machine 2.

The invention claimed is:

1. An electric machine, comprising:
   a motor shaft containing a bearing-side shaft shank having a circumferential side with an annular groove formed therein;
   a machine housing;
   a stator disposed in said machine housing;
   a rotor disposed in said machine housing and disposed on said motor shaft supported on a non-drive side;
   a bearing unit on said non-drive side disposed axially displaceably within said machine housing and having a ball bearing configuration with bearing inner rings, said bearing unit further having a sleeve enclosing said ball bearing configuration, and an elastomeric element, on which said sleeve rests radially elastically such that said sleeve can be displaced in an axial direction;
   a coupling unit, said motor shaft being guided out of said machine housing on a drive side without a bearing and guided to said coupling unit;
   a shrink disk disposed at said coupling unit and providing a rigid coupling of said motor shaft to a machine shaft of a work machine; and
   said bearing unit further having an inner securing ring for axially fixing an adjacent one of said bearing inner rings of said ball bearing configuration, said inner securing ring having a ring outer edge seated in said annular groove disposed on said circumferential side in said bearing-side shaft shank of said motor shaft.

2. The electric machine according to claim 1, wherein:
   said sleeve has an outer side with an annular groove formed therein; and
   said elastomeric element is received in said annular groove of said sleeve.

3. The electric machine according to claim 2,
   further comprising a bearing hub receiving said bearing unit; and
   wherein said elastomeric element is received in such a way by said annular groove of said sleeve and is introduced on said outer side into said sleeve, in such a way that said sleeve is held in said bearing hub such that said sleeve is secured against rotation and can be displaced axially at least slightly.

4. The electric machine according to claim 1, wherein said ball bearing configuration contains a compensation washer in a manner of an ondular washer and two deep-groove ball bearings being braced with respect to one another by means of said compensation washer.

5. The electric machine according to claim 4, wherein:
   said deep-groove ball bearings have said bearing inner rings; and
   said bearing unit has an adjusting washer disposed between said bearing inner rings of said deep-groove ball bearings.

6. The electric machine according to claim 1, wherein:
   said ball bearing configuration has bearing outer rings; and
   said bearing unit has an outer securing ring for axially fixing an adjacent one of said bearing outer rings of said ball bearing configuration.

7. The electric machine according to claim 6, wherein:
   said sleeve has an inside with an annular groove formed therein; and
   said outer securing ring has a washer outer edge seated in said annular groove formed on said inside in said sleeve.

8. The electric machine according to claim 1, wherein said elastomeric element is an O-ring.

9. The electric machine according to claim 1,
   further comprising a bearing hub receiving said bearing unit and having an outer side with an annular groove formed therein; and
   said elastomeric element received by said annular groove formed in said bearing hub.

10. The electric machine according to claim 9, wherein said elastomeric element is received in such a way by said annular groove of said bearing hub and is introduced on the outer side into said bearing hub, in such a way that said sleeve is held in said bearing hub such that said sleeve is secured against rotation and can be displaced axially at least slightly.

11. An electric machine comprising:
    a motor shaft having a bearing-side shaft shank with an annular groove formed therein, a machine housing, a stator disposed in the machine housing, a rotor disposed in the machine housing and disposed on the motor shaft supported on a non-drive side, a coupling unit, the motor shaft being guided out of the machine housing on a drive side without a bearing and guided to the coupling unit, and a shrink disk disposed at the coupling unit and providing a rigid coupling of the motor shaft to a machine shaft of a work machine;
    a bearing unit including:
       a ball bearing configuration having bearing inner rings;
       a sleeve enclosing said ball bearing configuration;
       an elastomeric element, on which said sleeve rests radially elastically such that said sleeve can be displaced in an axial direction; and
       an inner securing ring for axially fixing an adjacent one of said bearing inner rings of said ball bearing configuration, said inner securing ring having a ring outer edge seated in the annular groove disposed on a circumferential side in the bearing-side shaft shank of the motor shaft.

12. A drive unit, comprising:
    a power machine, containing:
       a motor shaft having a bearing-side shaft shank with an annular groove formed therein;
       a machine housing;
       a stator disposed in said machine housing;
       a rotor disposed in said machine housing and disposed on said motor shaft supported on a non-drive side;
       a bearing unit on said non-drive side disposed axially displaceably within said machine housing and having a ball bearing configuration with bearing inner rings, said bearing unit further having a sleeve enclosing said ball bearing configuration, and an elastomeric element, on which said sleeve rests radially elastically such that said sleeve can be displaced in an axial direction;
       a coupling unit, said motor shaft being guided out of said machine housing on a drive side without a bearing and guided to said coupling unit;
       a shrink disk disposed at said coupling unit and providing a rigid coupling of said motor shaft to a machine shaft of a work machine; and
       said bearing unit further having an inner securing ring for axially fixing an adjacent one of said bearing inner rings of said ball bearing configuration, said inner securing ring having a ring outer edge seated in said annular groove disposed on a circumferential side in said bearing-side shaft shank of said motor shaft; and
    a work machine.

13. The drive unit according to claim 12, wherein said working machine is a pump with a self-mounting means.

14. The drive unit according to claim 13, wherein said pump is a hydraulic pump.

* * * * *